Jan. 17, 1928.

E. H. BUCKNELL ET AL 1,656,772

VALVE

Filed Sept. 7, 1926

INVENTOR.
Ernest H. Bucknell
BY Ralph E. Bletcher
Nestall and Wallace
ATTORNEYS.

Patented Jan. 17, 1928.

1,656,772

UNITED STATES PATENT OFFICE.

ERNEST H. BUCKNELL AND RALPH E. BLETCHER, OF LOS ANGELES, CALIFORNIA.

VALVE.

Application filed September 7, 1926. Serial No. 133,820.

This invention relates to a valve structure having renewable port control elements, and pertains more particularly to a valve having an operating stem for moving a port control member into closed and open position.

It is the current practice to provide disc valve structures with a casing having a port and a disc on an operating stem to close and open the port. It is the practice to provide the casing with a tubular extension or stem housing having internal threads engaged with corresponding threads on the stem whereby the valve may be moved to and from its seat by turning the stem. Such structures wear at the thread requiring replacement of parts. If the threads are formed in a portion of the structure integral with the casing, the entire casing must be replaced. Valves of this character have been provided with detachable bonnets having a thread therein. The bonnet may then be replaced. In instances where the valve is concealed, this may result in a troublesome job requiring mutilation of the wall or part of the structure in which the valve is concealed. The present invention has for its primary object, the provision of a valve structure wherein the valve seat, stem, closure member cooperating with the seat and the threaded portions may all be removed and replaced through the stem housing opening. A more specific object of this invention is to provide a valve casing having a renewable valve seat engaged by a thread with the valve closure member and operable by a stem extending through the casing.

Figure 1:
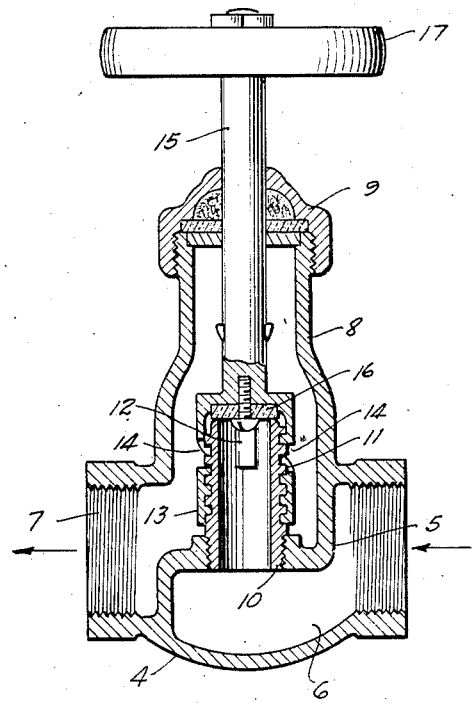
Figure 2:
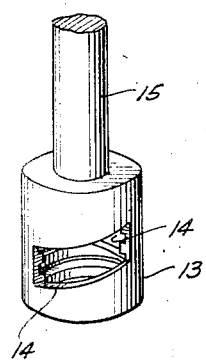
Figure 3:
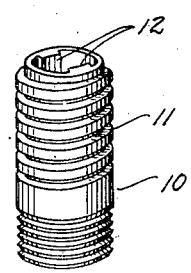

With these objects in view and certain other objects and corresponding accomplishments the invention consists in novel features of construction and the arrangements thereof fully described hereinafter and illustrated in the accompanying drawings:

Fig. 1 is a vertical section through a complete valve; Fig. 2 is a perspective view showing the tubular valve closure member, and Fig. 3 is a perspective view showing the renewable valve seat.

Referring with more particularity to the drawing, 4 indicates a valve body divided by a partition 5 into an inlet chamber 6 and an outlet chamber 7. The partition is provided with a port opening internally threaded to receive a tubular seat member later described. The body or casing is provided with a tubular extension 8 to accommodate the valve stem. The upper end of the extension is externally threaded to receive a gland nut 9 for packing the valve stem.

Mounted in the port opening is a tubular seat member 10 provided with threads 11. For convenience in screwing the tubular member into position, internal lugs 12 have been provided to serve as a hold for a tool. Mounted over the tubular seat is a closure member 13 of dome form and provided with lateral openings 14. There are internal threads 15 cooperating with threads 11. The closure member 13 is closed at the top and provided with a stem 15. Within and at the head of the dome is a washer 16 adapted to rest upon the rim of the tubular member 10. A hand wheel 17 is secured to the stem for turning the latter.

The construction is such that by turning the stem so as to raise the closure member upon the seat 10, the ports 14 will clear the side wall of the seat, and liquid may pass through the tubular member, and through the ports 14 to the outlet chamber 7. When the closure member is lowered so that member 13 seats upon the tubular member 10, washer 16 resting on top of the seat and sealing the latter, the passage of liquid from the inlet to the outlet will be shut off. When it is desired to renew any of the parts, gland nut 9 is removed and valve 15 turned so as to disengage the closure member from the seat. The stem and closure member may then be removed from the casing. The valve seat may now be removed by inserting a tool to engage the lugs 12 and the valve seat may be turned to unscrew the latter from the partition 5. The replacement operation is obvious from the foregoing description.

What we claim is:

1. In a valve structure, a body having an aligned inlet and outlet chamber with a ported partition between and a valve stem housing axially aligned with the port and at right angles to said inlet and outlet, a threaded tubular seat member detachably secured in the port and removable through said housing, a valve closure dome member telescopically secured to said seat member, there being lateral port openings in said closure member for communicating with the bore of said seat member so as to be closed and opened by said closure member, said closure member being engaged with the thread of said seat member, and an operating stem to turn said closure member whereby to open and close said port.

2. In a valve structure, a body having an inlet and an outlet chamber with a ported partition between and a tubular valve stem housing in axial alignment with the port, a threaded tubular seat member detachably secured in the port and removable through said housing, a valve closure dome telescopically mounted on said seat member and engaged with a thread thereof, a port opening in the side of said closure dome adapted to be opened and closed by movement of said closure dome over said seat member, and an operating stem to turn said closure member extending through said casing and freely slidable therein.

3. In a valve structure, a body having an inlet and an outlet chamber with a ported chamber within and a tubular valve stem housing in axial alignment with the port, a threaded tubular seat member detachably secured in the port and removable through said hausing and having an external thread, a valve closure dome member telescopically mounted over said seat member and engaged with the threads thereof, said closure member having port openings in its side, a washer in the head of said dome member for engaging the rim of said seat member and an operating stem secured to said closure member and freely slidable in said casing.

4. In a valve structure, an integral body having an aligned inlet and outlet with a ported partition between and a valve stem housing axially aligned with the port and at right angles to said inlet and outlet, a threaded tubular seat member detachably secured in the port and removable through said housing, a valve closure dome member telescopically secured to said seat member and engaged with the threads thereof and having a lateral port, a washer in the head of said dome member to engage the rim of said seat member, and an operating stem to turn said closure member whereby to open and close port.

In witness that we claim the foregoing we have hereunto subscribed our names this 31st day of August, 1926.

RALPH E. BLETCHER.
ERNEST H. BUCKNELL.